(12) United States Patent
Boltz

(10) Patent No.: US 6,311,055 B1
(45) Date of Patent: Oct. 30, 2001

(54) SYSTEM AND METHOD FOR PROVIDING RESTRICTIONS ON MOBILE-ORIGINATED CALLS

(75) Inventor: David Boltz, Garland, TX (US)

(73) Assignee: Ericsson Inc, Research Triangle Park, NC (US)

( * ) Notice: Subject to any disclaimer, the term of this patent is extended or adjusted under 35 U.S.C. 154(b) by 0 days.

(21) Appl. No.: 08/942,658

(22) Filed: Oct. 2, 1997

(51) Int. Cl.[7] ............................. H04M 3/42; H04M 1/66; H04Q 7/20; H04B 1/38
(52) U.S. Cl. ..................... 455/414; 455/433; 455/558; 455/565; 379/196; 379/199; 379/200; 379/201
(58) Field of Search ................................ 455/403, 414, 455/415, 432, 433, 435, 461, 550, 557, 558, 560, 561, 564, 565, 566; 379/88.22, 88.23, 88.25, 196, 197, 198, 199, 200, 201, 357; 370/259, 522

(56) References Cited

U.S. PATENT DOCUMENTS

| | | | |
|---|---|---|---|
| 5,212,810 | * | 5/1993 | Maeda et al. ......................... 379/200 |
| 5,274,698 | * | 12/1993 | Jang ..................................... 379/200 |
| 5,404,580 | * | 4/1995 | Simpson et al. ..................... 455/565 |
| 5,428,665 | * | 6/1995 | Lantto .................................. 455/433 |
| 5,504,804 | * | 4/1996 | Widmark et al. ..................... 455/433 |
| 5,577,103 | * | 11/1996 | Foti ...................................... 455/414 |
| 5,610,972 | | 3/1997 | Emery et al. ........................... 379/58 |
| 5,680,446 | * | 10/1997 | Fleishcher, III et al. ............. 379/197 |
| 5,758,281 | * | 5/1998 | Emery et al. ......................... 455/433 |
| 5,765,108 | * | 6/1998 | Martin et al. ......................... 455/565 |
| 5,794,142 | * | 8/1998 | Vanttila et al. ....................... 455/414 |
| 5,815,808 | * | 9/1998 | Valentine .............................. 455/414 |
| 5,884,193 | * | 3/1999 | Kaplan ............................... 379/88.23 |
| 5,903,845 | * | 5/1999 | Buhrmann et al. .................. 455/461 |
| 5,920,820 | * | 7/1999 | Qureshi et al. ...................... 455/461 |

FOREIGN PATENT DOCUMENTS

| | | |
|---|---|---|
| WO 93/03585 | 2/1993 | (WO) . |
| WO 96/13949 | 5/1996 | (WO) . |

OTHER PUBLICATIONS

Smith, David G., An Introduction to GSM Enhancements for Operator Specfic Services (Camel), 1988 The Institution of Electrical Engineers, p. 6/1–6/9.

European Telecommunication Standard, Source: ETSI TC–SMG, European Digital Cellular Telecommunications System (Phawse 2); Call Barring (CB) Supplementary Services–13 Stage 1 (GSM 01.88), Dec. 12, 1995.

(List continued on next page.)

Primary Examiner—Nay Maung
(74) Attorney, Agent, or Firm—Jenkens & Gilchrist

(57) ABSTRACT

A cellular telephony network includes a supplementary service (SS) database in an intelligence network (IN) node. The SS database stores subscriber record which includes call barring data such as screening lists of specific numbers or countries and call barring options that indicate the treatment of the call barring data. The SS database may be located in an IN node connected to a mobile service center/visitor location register in a cellular telephony network or a signaling database point in a signaling network connected to the cellular telephony network or in the home location register of the cellular telephony network. At call origination, the MSC/VLR transmits the requested called number and MSISDN of the mobile subscriber to the SS database. The IN node compares the requested called number to the subscriber record associated with the MSISDN of the mobile subscriber and transmits a message to the MSC/VLR indicating whether the call is barred. In an alternate embodiment, a subscriber record is stored on a subscriber identity module (SIM) in a mobile station.

19 Claims, 3 Drawing Sheets

OTHER PUBLICATIONS

GSM Technical Specification, Source: ETSI TC–SMG, Digital Cellular Telecommunications System; Unstructured Supplementary Service Data (USSD)—Stage 1 (GSM 01.90), Version 5.1.0, Mar. 1997.

GSM Technical Specification, Source: ETSI TC–SMG, Digital Cellular Telecommunications System; Unstructured Supplementary Service Data (USSD)—Stage 2 (GSM 03.90), Version 5.0.0, Dec. 1996.

European Telcommunication Standard, Source: ETSI TC–SMG, Digital Cellular Telecommunications System (Phase 2); Call Barring (CB) Supplementary Services—Stage 3 (GSM 04.88), 2nd Ed., Aug. 1996.

Mouly and Pautet, The GSM System for Mobile Communications, A Comprehensive Overview of the European Digital Cellular Systems, Sec. 1.3, pp. 47–76.

* cited by examiner

SYSTEM AND METHOD FOR PROVIDING RESTRICTIONS ON MOBILE-ORIGINATED CALLS

BACKGROUND OF THE INVENTION

1. Technical Field of the Invention

The present invention relates to supplementary services in a cellular telephony network, and more particularly to a barring of outgoing calls in a cellular telephony network.

2. Background of the Invention

Supplementary services in a cellular telephony network are additional features to either teleservices or bearer services. Supplementary services typically provide treatment options for incoming or outgoing calls. With respect to outgoing calls, presently supplementary services in cellular telephony networks only provide three options: barring of all outgoing calls, barring outgoing international calls, and barring all outgoing international calls except those directed to the home PLMN (public land mobile network) country. The first option, barring of all outgoing calls, makes it possible for a mobile subscriber to block all outgoing calls or all calls associated with a basic service. The second option, barring all international calls makes it possible for a mobile subscriber to block international calls outside of the subscriber's home PLMN country. Outgoing calls may only be made to subscribers of the home PLMN and the fixed network of the country where the subscriber is presently located. The present PLMN may be the home PLMN or a visited PLMN. Finally, the third option, barring outgoing international calls except those directed to the home PLMN country, makes it possible for a mobile subscriber to prevent all attempted outgoing international calls except those international calls to the home PLMN country of the mobile subscriber. Outgoing calls are restricted to subscribers of the PLMN and the fixed network of the country where the mobile subscriber is presently located or to mobile subscribers of the home PLMN country of the served mobile subscriber and to subscribers of the fixed network in the home PLMN country. The present PLMN may be the home PLMN or a visited PLMN. This option again may be associated with all services or with a specific basic service.

A mobile subscriber requests the provision of a supplementary service from the service provider of the PLMN. At provision, the mobile subscriber selects the various supplementary services and the manner in which the mobile subscriber may activate the supplementary services. The mobile subscriber may elect two ways to activate the provided supplementary services: by the service provider or by the mobile subscriber with the use of a password. If the mobile subscriber elects for activation by the service provider, the supplementary services can not be activated or changed by the mobile subscriber. Under the second election, the supplementary services may be activated by the mobile subscriber using a password. The service provider must initially register a password for the mobile subscriber which can be changed later by the mobile subscriber. The mobile subscriber may then active the supplementary service by providing the password and information as to whether calls of all services or calls of a specific basic service group should be barred. The mobile subscriber may also change the barring options by issuing commands on a mobile station keyboard and entering the password. Specified command protocols may be used (such as **33* for barring of all outgoing calls) or menu driven applications may be implemented in the mobile station for collection of the barring options from the mobile subscriber. Once activated, the supplementary service is automatically invoked by the cellular telephony network upon a request for an outgoing call not allowed by the active barring option for the corresponding basic service group. If the outgoing call is barred under the active barring option, the network will refuse the outgoing call request and issue a message indicating the rejection to the mobile station. Thus, in a typical cellular telephony network, a mobile subscriber has only three call barring options as part of the supplementary services. A mobile subscriber is unable to elect to bar calls to specific numbers or countries. A need has thus arisen in the industry for more flexible supplementary services for outgoing call barring in a cellular telephony network.

SUMMARY OF THE INVENTION

The present invention is directed to supplementary services for barring outgoing calls in a cellular telephony network. In a first embodiment, the cellular telephony network includes a supplementary service (SS) database in an intelligence network (IN) node. The SS database stores subscriber records which contain subscriber defined call barring data such as screening lists of specific numbers or countries. The subscriber record may also indicate subscriber specific call barring options that indicate the treatment of the call barring data, such as an option to allow all MS originating calls on a screening list or an option to disallow all MS originating calls on screening list. The SS database may be located in an IN node connected to a mobile service center/visitor location register in a cellular telephony network or a signaling database point in a signaling network connected to the cellular telephony network or in the home location register of the cellular telephony network. At call origination, the MSC/VLR transmits the requested called number and MSISDN of the mobile subscriber to the SS database. The IN node compares the requested called number to the subscriber record associated with the MSISDN of the mobile subscriber and transmits a message to the MSC/VLR indicating whether the call is barred.

In an alternate embodiment, a subscriber record is stored within a memory, such as within a subscriber identity module (SIM), in a mobile station. The SIM stores a subscriber record of the mobile subscriber associated with the SIM. Again, the subscriber record contains subscriber defined call barring data such as screening lists of specific numbers or countries. The subscriber record may also indicate subscriber specific call barring options that indicate the treatment of the call barring data, such as an option to allow all MS originating calls on a screening list or an option to disallow all MS originating calls on a screening list. At call origination, the mobile station reads the subscriber record stored in the SIM and compares the requested outgoing call to the call barring options. If the subscriber record indicates that the call is barred, the mobile station displays a call barred message to the mobile subscriber.

BRIEF DESCRIPTION OF THE DRAWINGS

For a more complete understanding of the present invention and for further objects and advantages thereof, reference may now be had to the following description taken in conjunction with the accompanying drawings, in which like numerals are used for similar parts.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein.

Figure 1:
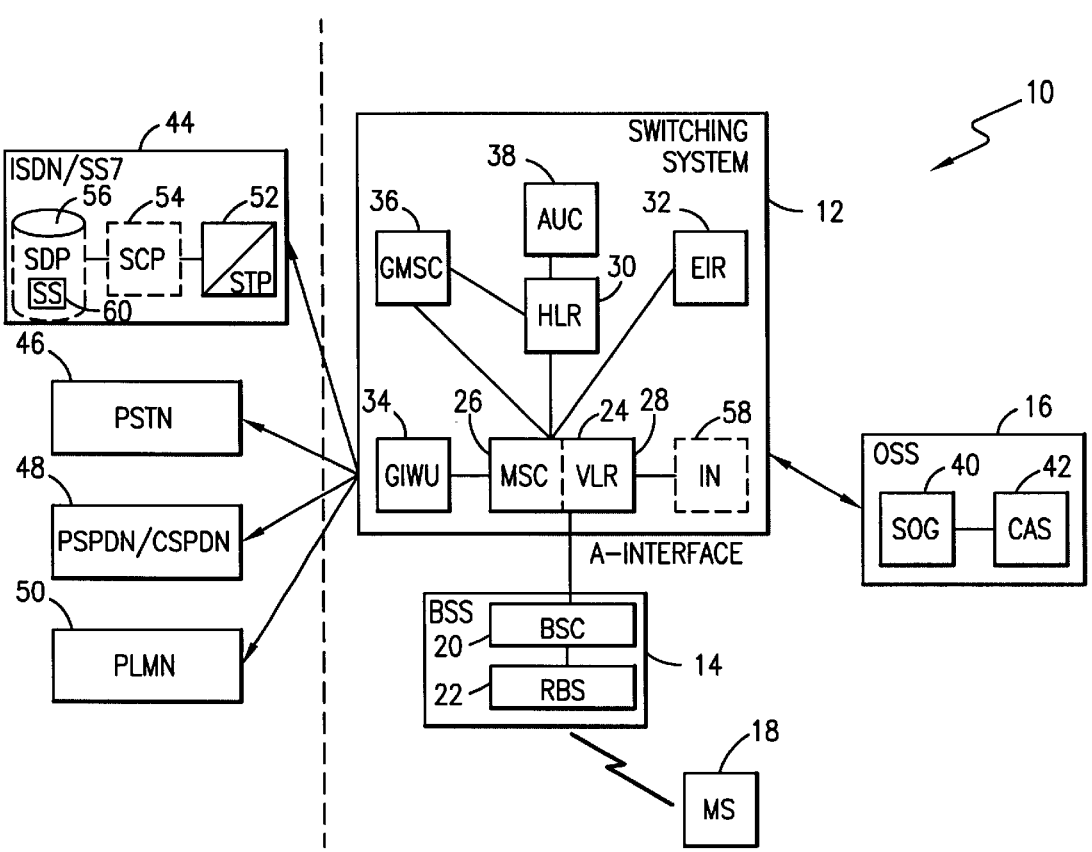
FIG. 1 illustrates a cellular telephony network in which the present invention may be incorporated.

FIG. 1 illustrates a cellular telephony network 10 in which the present invention may be implemented. The cellular telephony network 10 illustrated is an implementation of the GSM (Global System for Mobile communication) standard, though a person of skill in the art would appreciate that cellular telephony networks based on other standards or architectures may be used to implement the present invention as well. The cellular telephony network 10 includes a switching system 12, a base station system (BSS) 14, Operation and Support System (OSS) 16, and at least one mobile station 18.

The base station system 14 is responsible for the radio-based functions in the cellular telephony network 10 and manages radio communication with the mobile station 18, including call handovers between cells serviced by the base station system 14, and the setting-up and releasing of call connections. The base station system 14 also manages radio network resources and cell configuration data. The base station system 14 includes the base station controller (BSC) 20 and radio base station (RBS) 22.

The BSC 20 may be implemented as a stand-alone node or as integrated with the MSC/VLR 24 in the switching system 12. The BSC 20 controls and supervises a large number of radio base stations (RBS) 22 (though only one is shown in FIG. 1). The radio base station 22 includes the radio equipment needed to communicate with the mobile station 18. Though only one mobile station (MS) 18 is shown in FIG. 1, typically a plurality of mobile stations 10 are located in a geographical area serviced by the radio base station 22. The base station system 14 provides an interface between the mobile station 18 and the switching system 12. Typically, the base station controller 20 uses digital facilities to communicate with the MSC/VLR 24 over what is referred to as the A interface.

The MSC/VLR 24 includes both the mobile switching center (MSC) 26 and visitor location register (VLR) 28. Though the MSC 26 and VLR 28 may be separate nodes, it is preferred to incorporate both into the same node to reduce signaling load over the network. The MSC 26 manages the calls, such as setting up calls, routing, termination of a call, and coordinates the operation of the connected base stations systems 14 within the cellular telephony network 10. In addition, the MSC 26 acts as switch to direct calls to and from the proper base station system 14. The VLR 28 is used to store temporary information about all mobile subscribers currently located in the service area of the MSC 26. The temporary information includes information on visiting subscribers who are not in the home service area and roaming information that allows subscriber to use their mobile station in another city. The MSC/VLR 24 is also connected to the home location register (HLR) 30, equipment identity register (EIR) 32, GSM Interworking Unit (GIWU) 34, and Gateway MSC (GMSC) 36.

The HLR 30 stores subscriber information for all subscribers within the PLMN of the service provider. The HLR 30 may be linked to other service areas so that subscriber information may be shared between networks. The HLR 30 may also be implemented together with the MSC/VLR 24 or as a stand-alone node as shown in FIG. 1.

The EIR 32 and Authentication Center (AUC) 38 are databases to provide security in the cellular telephony network 10. The AUC 38 confirms that a subscriber identity is valid to protect against unauthorized use of the network. Authentication is applied at each registration of a mobile station 18, at each call set-up attempt, and before supplementary service activation or de-activation. The EIR 32 enables the MSC/VLR 24 to check the mobile equipment identity using an international mobile station equipment identity (IMEI) of the mobile station 18 to make sure that no stolen or unauthorized mobile equipment is used.

The GIWU 34 provides interworking between the cellular telephony network 10 and other external networks. The GIWU 34 is a modem and fax adapter pool and performs rate adaption.

The GMSC 36 provides a gateway for incoming calls to a mobile subscriber and connects the cellular telephony network with other networks. It is the point in the PLMN where calls to mobile subscriber first enter. The GMSC 36 routes a call to a mobile station 18 according to the location information provided by the HLR 30.

The switching system 12 is connected to an operation and support system (OSS) 16 that includes a service order gateway (SOG) 40 and customer administration system (CAS) 42. The OSS 16 consists of different applications for operation and maintenance of new subscribers and network elements. The remote OSS 16 allows connections to different network elements by sending commands to the network element from the workstation or terminal. Thus, various tasks to operate and configure the network may be performed. For example, using a file management utility, an operator can read, modify, create or delete files in network elements to update or add subscriber information.

The cellular network 10 is connected to various other telecommunications networks, including a signaling system 7 network (SS7) 44, public switched telephone network (PSTN) 46, public switched packet data network (PSPDN) 48, and other public land mobile networks (PLMN) 50. The SS7 network 44 provides signaling for the cellular telephony network 10 and includes one or more signaling transfer points (STP) 52 and a signaling control point (SCP) 54 and a signaling database point (SDP) 56. The functions and databases of SDP 56 may alternatively be incorporated within the SCP 54.

Figure 2:
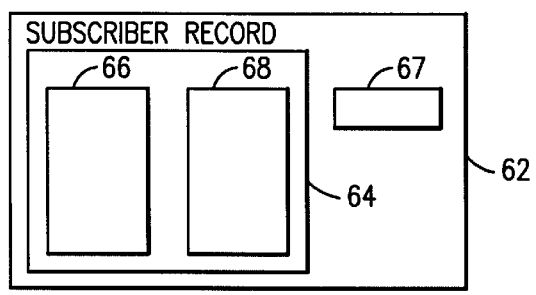
FIG. 2 illustrates a block diagram of a subscriber record in the supplementary service database of the present invention.

In the present invention, the SDP 56 includes a database of subscriber records, called a supplementary service (SS) database 60. The SS database 60 includes a record for each subscriber in the cellular telephony network 10. The subscriber records within the SS database 60 may be shared amongst several PLMNs 50 to communicate subscriber information when roaming. A block diagram in FIG. 2 illustrates, in pictorial form, the information stored in a subscriber record 62 in the SS database 60. Each subscriber record 62 in the SS database 60 includes, inter alia, call barring data 64 for the mobile subscriber associated with the subscriber record. The call barring data 64 includes one or more screening lists 66 of specific numbers or countries or area codes. In addition, the call barring data 64 includes call barring options 68 that indicate treatment of the call barring data or other options. For example, the calling barring options 68 may include an option to allow all originating calls on a particular screening list 66 in the subscriber record or an option to disallow all MS originating calls on another screening list. The call barring options 68 may also include typical call barring options offered such as barring of all outgoing calls, barring outgoing international calls, and barring all outgoing international calls except those directed to the home PLMN country. A subscriber record 62 may include any combination of the calling options and/or screening lists. Thus, the subscriber record 62 may indicate in a screening list 66 specific numbers to bar and also indicate in the call barring options 68 that all outgoing international calls are barred as well. The subscriber records 62 further include a password 67 to protect the subscriber record 62 from unauthorized access or modification.

The subscriber records 62 are associated with a specific mobile subscriber using an international mobile subscriber identity (IMSI) of the mobile subscriber. The IMSI consists of three different parts:

$$IMSI=3D\ MCC+MNC+MSIN$$

where the MCC is a three digit mobile country code, the MNC is a 2 digit mobile network code, and the MSIN is a maximum ten digit mobile subscriber identification number. The IMSI preferably has a maximum length of fifteen digits. It should nonetheless be understood that alternative numbers can be used, e.g., Mobile Subscriber ISDN numbers.

The IMSI is a unique, specific identification of each subscriber. It is stored in the home location register (HLR) 30 and the serving VLR 28 of the mobile station 18. The IMSI is also stored in the subscriber identity module (SIM) of the mobile station 18 which is explained in more detail with respect to FIG. 4. The IMSI is used for all signaling in the PLMN 50 to correctly identify a particular mobile subscriber. All network related subscriber information is connected to the IMSI of the mobile subscriber. For subscriber confidentiality, a temporary mobile subscriber identity (TMSI) may be allocated to the mobile station 18 by the serving MSC/VLR 24 for transmission over the air interface.

In an alternative embodiment, the SS database 60 may be located within another intelligence network node (IN) node 58 connected through a wireline to the MSC/VLR 24. The IN node 58 is preferably shared amongst all the MSC/VLRs 24 in the PLMN of the cellular network 10. In still another embodiment, the SS database 60 may be located within the HLR 30. Thus, the SS database 60 may be located in anyone of three types of intelligent network nodes: a signaling database point in a signaling system or intelligent network, such as SDP 56, within a separate IN node connected to the MSC/VLR 24 of the cellular network 10, such as IN node 58, or located within the HLR 30 of the cellular network 10.

The operation of the present invention is now explained with reference to FIG. 3. In step 70 of FIG. 3, the mobile station 18 registers with the cellular telephony network 10. The mobile station 18 needs to register with the cellular telephony network 10 in two situations: at first power-up and when the mobile station 18 roams into an area served by a new MSC/VLR 24. Whenever the mobile station 18 first powers-up or roams into a new area, the mobile station 18 attempts to register with the serving MSC/VLR 24 by transmitting an identification number, such as the IMSI number or the TMSI number, associated with the mobile subscriber. The MSC/VLR 24 uses the received IMSI or TMSI number to transmit a location update signal to the home location register associated with the mobile station 18. If the cellular telephony network 10 is the home PLMN of the mobile station 18, then the HLR 30 is the home location register associated with the mobile station 18. If the mobile station 18 is roaming, then the home location register associated with the mobile station 18 may be a home location register in another PLMN 50. The MSC/VLR 24 transmits a Mobile Application Part (MAP) message, i.e., an SS7 connectionless signal, to the HLR 30 associated with the mobile station 18. The MAP message uses the received IMSI or TMSI number as a signaling connection control point (SCCP) destination address. This address enables the connecting telecommunications network to route the transmitted signal from the serving MSC/VLR 24 to the home HLR 30 associated with the mobile subscriber. The HLR 30 verifies the identity of the mobile subscriber with the AUC 38 and EIR 32. The HLR 30 also updates its database to take note of the MSC/VLR 24 currently serving the mobile station 18. The location information in the HLR 30 is used to reroute incoming calls to the mobile station 18 to the correct serving MSC/VLR 24.

Figure 3:
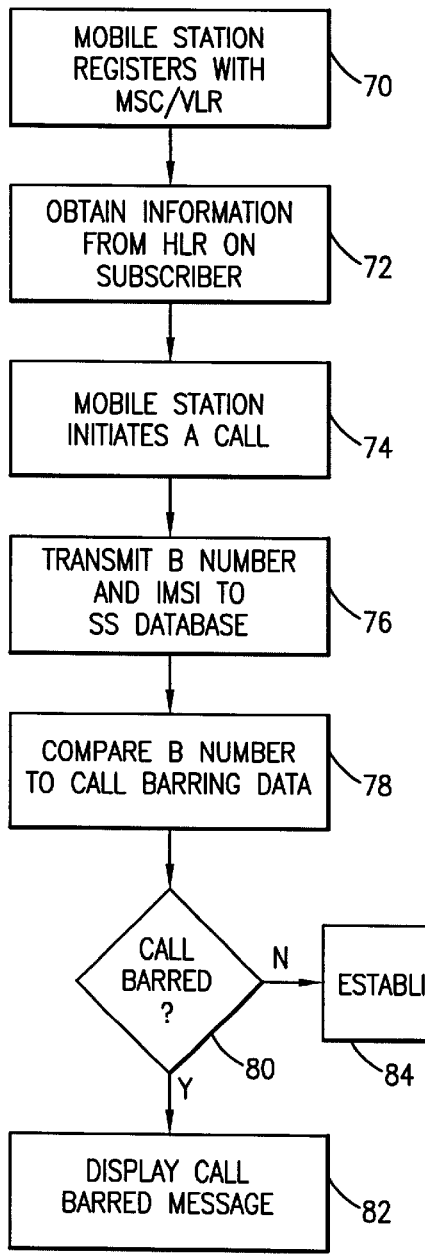
FIG. 3 illustrates a flow chart of the operation of the first embodiment of the present invention.

The HLR 30 also retrieves subscriber data associated with the mobile station 18 and communicates the retrieved data to the serving MSC/VLR 24, as shown in step 72 of FIG. 3. Again, this data is sent in a MAP message to the MSC/VLR 24. Upon receiving the subscriber data, the MSC/VLR 24 stores the subscriber data in the VLR 28. The VLR 28 stores the subscriber data in its database and associates the subscriber data with the IMSI number of the mobile subscriber. In the present invention, the subscriber data includes information on whether the mobile subscriber has subscribed to supplementary services, such as call barring services. The VLR 28 thus has information on whether a mobile subscriber has subscribed to call barring supplementary services. Other subscriber data may include, for example, call forwarding features, billing data, long distance carrier data, etc. The subscriber data is used by the MSC/VLR 24 when providing service to the mobile station 18. By requiring the serving MSC/VLR 24 to retrieve subscriber data from the home HLR 30 associated with the mobile station 18, regardless of which MSC/VLR 24 is serving the mobile station 18, the same subscriber data is used to provide uniform service to the mobile station 18.

In step 74 of FIG. 3, the mobile station 18 originates a call. At call origination, the mobile station requests service on the reverse access channel (RACH). The base station system 14 acknowledges and transmits the number of a slow dedicated control channel (SDCCH) to the mobile station 18. The mobile station 18 transmits a SABM message with the type of message over the SDCCH. For call set-up and supplementary services, the message type is RIL3-CC. The base station system 14 acknowledges and requests a connection with the MSC/VLR 24 through a SCCP message connection request. The MSC 26 sends a "MAP/B Service Request" message to the VLR 28. The MSC 26 may initiate authentication of the mobile station 18 as well. The MSC 26 may assign a TMSI number to the mobile station 18. The mobile station 18 will then initiate call establishment be sending a RIL3-CC Set-Up message. The message includes the MS-ISDN number, the number of the called party (the B#) and the type of service requested. The MSC 26 sends a "MAP/B Send Call setup Information" message to the VLR 28 which contains the information on the mobile station 18. The VLR 28 responds with a "MAP/B Call Complete" message listing the mobile station 18 capabilities, subscribed services and parameters needed by the network to properly allocate a channel for the call. The subscribed services in the "MAP/B Call Complete" message from the VLR 28 indicates to the MSC 26 whether the mobile station 18 subscribes to call barring features. If the mobile subscriber does subscribe to call barring features, the MSC 26 transmits a MAP message to the signaling database point (SDP) 56 with the IMSI of the mobile subscriber and the called party's B-number to determine the services activated, as shown in step 76.

The SDP 56 receives the message from the MSC 26 and accesses the subscriber record associated with the IMSI of the mobile subscriber in the SS database 60. The subscriber record indicates the call barring data and call barring options of the mobile subscriber. The SDP 56 analyzes the B-number to determine if it is among the calls barred by the subscriber record, as shown in step 78. For example, if the subscriber record indicates that all international calls are barred plus specific numbers are barred, the SDP 56 determines if the B-number is an international call or is one of the specific numbers in the screening list. The SDP 56 may send inquiries to the MSC/VLR 24 if more information is needed for the call barring analysis. For example, if the LAI (location area identity) of the serving MSC/VLR 24 is needed to determine whether a call is an International call, and the LAI was not included in the original message to the SDP 56, the SDP 56 transmits an inquiry SCCP message to the MSC/VLR 24 to determine the needed information. Once the SDP 56 has the needed information, it completes the B-number analysis to determine if the call is barred, as shown in step 80. In an alternative embodiment, the processing of the B-number may be performed by the signaling control point (SCP) 54 after accessing the subscriber record in the SDP 56. This alternative may be preferred if the SDP 56 is mainly a file server.

Once the subscriber record is analyzed and compared with the B-number to determine if the call is barred, the SDP 56, then transmits back to the MSC/VLR 24, in a SCCP or ISUP message whether the call is barred. The MSC/VLR 24 will read the return message to determine whether the call is barred as shown in step 80. If the call is barred, the MSC/VLR 24 will reject the call set-up and transmit a call reject message to the mobile station 18. The mobile station 18 will display a call bar message to the mobile subscriber, as shown in step 82. If the call is not barred, the MSC/VLR 24 will continue the call establishment as shown in step 84.

Alternatively, as explained above, the SS database 60 may be located in the IN node 58 rather than in the SS7 network 44. In this embodiment, the IN node 58 may access the subscriber record in the SS database 60 and perform an analysis of the subscriber record to determine if the call is barred. Similarly, in the alternative embodiment where the SS database is located in the HLR 30, the HLR 30 may access the SS database 60 therein and perform the B-number analysis.

In another alternate embodiment, the entire subscriber record 62 may be downloaded to the VLR 28 at the time the mobile station registers rather than the VLR 28 merely storing whether supplementary services are provided for the mobile station 18 in step 72 of FIG. 3. The MSC 26 could then access the subscriber record within the VLR 28 at call origination and perform the B-number analysis. However, this alternative would require much storage space in the VLR 28.

The mobile subscriber may change the screening lists and calling bar options in the subscriber record using supplementary service management. There are three ways in which the subscriber may modify the associated subscriber record. In a first alternative, the mobile subscriber contacts the CAS 42. The CAS 42 enters the new screening lists or calling options into the subscriber record in the subscriber database.

Figure 4:
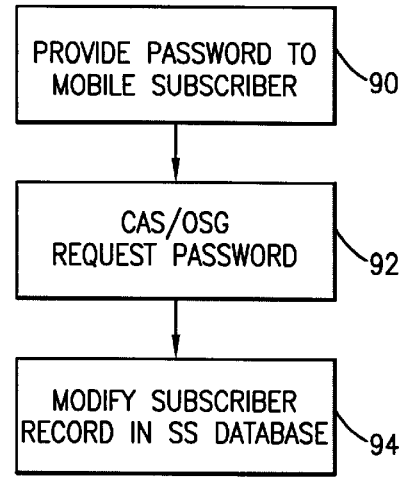
FIG. 4 illustrates a flow chart of a method for supplementary service management in the first embodiment of the present invention.

A second alternative is shown in FIG. 4. In the alternative of FIG. 4, the mobile subscriber accesses the subscriber record in the SS database 60 through a PSPDN 48. For example the PSPDN 48 may be the Internet. The PSPDN 48 may alternatively be connected to the SS database 60 through the PSTN 46 as is typical rather than directly as shown in FIG. 1. As explained above, during the provision of the supplementary services, the mobile subscriber may elect two options to activate the supplementary service: activation by the service provider or activation by the mobile subscriber by use of a password. In the method of activating the supplementary service of FIG. 4, the mobile subscriber must elect the option to be able to active the supplementary service through a password, as shown in step 90. Otherwise the cellular network will reject the mobile subscriber's access to the subscriber record. In step 92, the mobile subscriber accesses the SS database 60 through the PSPDN network 48 using TCP/IP protocol. The subscriber will be required to enter a password to access the associated subscriber record in the SS database 60, as shown in step 94. The password is verified and the subscriber record may then be modified by the mobile subscriber. The mobile subscriber may modify the screening list or call barring options or deactivate call barring completely.

Figure 5:
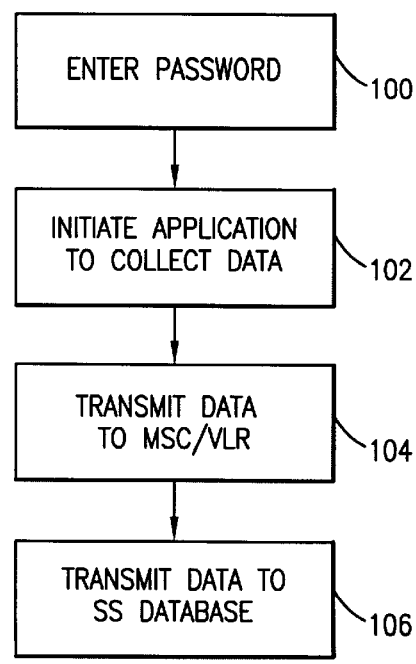
FIG. 5 illustrates a flow chart of another method for supplementary service management in the first embodiment of the present invention.
Figure 6:
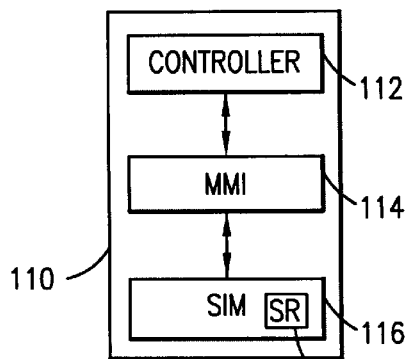
FIG. 6 illustrates a block diagram of a mobile station in a second embodiment of the present invention.

A third alternative for activating or deactivating the supplementary service is shown in FIG. 5. In this alternative, the mobile subscriber activates, deactivates or modifies the subscriber record through a menu driven command system in the mobile station 18. The mobile station 18 queries the mobile subscriber to enter a password in step 100 and then initiates in step 102 an application which preferably resides in the MSC/VLR 24 to collect the new call barring data. The mobile station 18 and MSC/VLR 24 communicate using USSD (unstructured supplementary service data) protocol messages to collect the necessary information from the mobile subscriber, as shown in step 104. The MSC/VLR 24 verifies the password entered by the mobile subscriber with the password 67 stored in the subscriber record 62, prior to modifying the subscriber record 62. The MSC/VLR 24 then transmits the modifications of the subscriber record 62 to the SS database 60 (either in the SDP 56 or IN node 58 or HLR 30) using SCCP messages, as shown in step 106. In this alternative again, the mobile subscriber must elect to activate the supplementary service by use of a password. It should be understood that the USSD message is transparent to the MSC/VLR 24, and may proceed from the MS 18 through the MSC/VLR 24 to the HLR 30. An alternative embodiment of providing the barring of outgoing calls is shown in FIG. 6. FIG. 6 illustrates a block diagram of a mobile station 110 which may be used in a typical cellular telephony network. The mobile station 110 includes a controller 112, man-mobile interface unit (MMI) 114 and subscriber identity module (SIM) 116. The SIM 116 stores various mobile subscriber data, such as the IMSI number, and may be removable from the mobile station 110. The mobile station 110 operates according to various data and options programmed into the SIM 116. The SIM 116 may be a smartcard or other device capable of memory storage. The SIM is a key which, if removed, causes the mobile station 110 to be inactive except for emergency calls. The SIM may be removed and placed in other mobile stations to configure the operation of the mobile station to the mobile subscriber's subscriber data. The SIM is protected by a password or PIN number. A mobile subscriber may record and modify part of the subscriber data on the SIM.

The SIM 116 includes a subscriber record 118 similar to that described with respect to FIG. 2. The subscriber record 118 includes call barring data such as a screening list of specific numbers or countries or area codes that the mobile subscriber wishes to bar as well as call barring options that indicate treatment of the call barring data or other options. The subscriber record 118 also includes a password as described with respect to FIG. 2.

The MMI 114 preferably is a keyboard and transducer for converting the dialed keys to electronic signals for processing by the controller 112. The MMI 114 also preferably includes a display for displaying menu options and other information.

Figure 7:
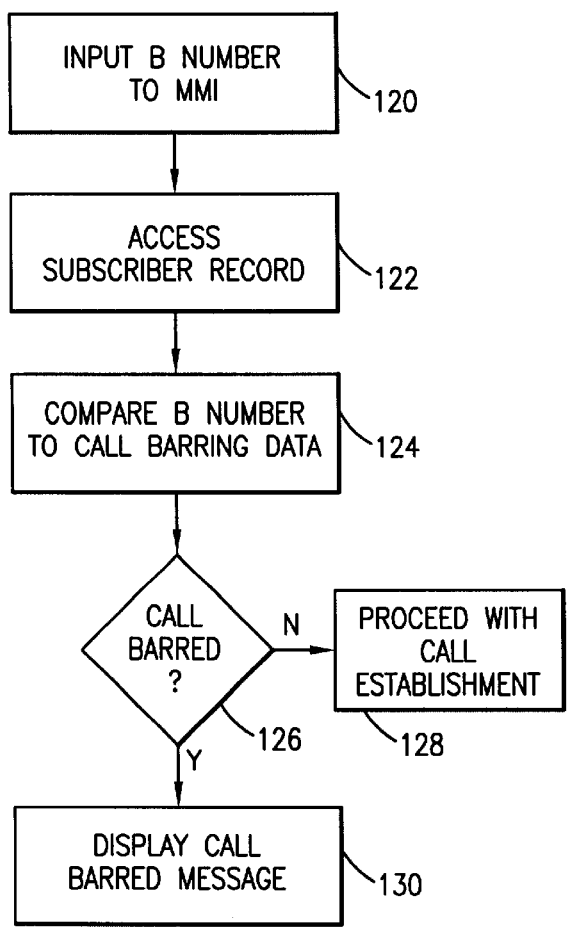
FIG. 7 illustrates a flow chart of the operation of the mobile station in the second embodiment of the present invention.

The operation of the mobile station 110 is now explained with reference to FIG. 7. The mobile subscriber enters a number of the party to be called, i.e, the B-number, into the MMI 114, as shown in step 120. The MMI 114 converts the inputted B-number to an electronic signal which is transmitted to the controller 112. The controller 112 accesses the subscriber record 118 in step 122 on the SIM 116 and reads the call barring data. The controller 112 compares the B-number to the numbers indicated as barred by the call barring data in the subscriber record 118, in step 124. The controller 112 determines if the call is barred in step 126. If the call is not barred, the controller 112 proceeds with the call establishment, shown in step 128. If the call is barred, the controller 112 rejects the call and displays a call barred message to the mobile subscriber, as shown in step 130. The call barring data stored in the subscriber record 118 on the SIM 116 may be modified by the mobile subscriber. The subscriber record 118 is preferably password protected to prevent any unauthorized modifications of the call barring data.

Figure 8:
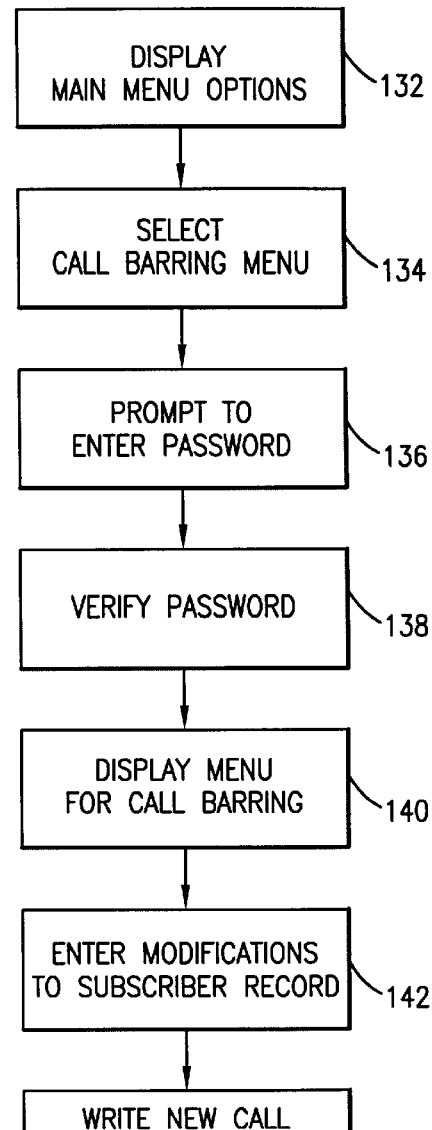
FIG. 8 illustrates a flow chart of a method for subscriber record management in the second embodiment of the present invention.

FIG. 8 illustrates the operation of modifying the call barring data of the mobile station 110. In step 132, the mobile station 110 displays a main menu with various options including a menu for the call barring feature. The mobile subscriber selects the menu option corresponding to the call barring feature in step 134. The mobile station 110 will prompt the mobile subscriber for a password in step 136. The controller 112 will then compare the password to the password stored on the SIM 116. This verification of a password in step 138 prevents an unauthorized modification of the call barring data.

If the password is verified, the mobile station 110, displays a menu for the call barring feature including options for changing the password, screening lists or call barring options stored in the subscriber record 118, as shown in step 140. The mobile subscriber may modify the call barring data by selecting the corresponding menu option and entering the desired new data in step 142. The mobile station 110 then stores the new call barring data to the subscriber record 118 in the SIM 116, as shown in step 144.

The call barring feature included in the mobile station 110 in FIG. 6 has the advantage that no interaction is needed with the cellular telephony network. Thus, no air traffic is generated as in the first embodiment for a call that is barred.

The present invention provides for a more flexible call barring service than in the prior art. A subscriber record is able to store additional call barring data than previously stored in a cellular telephony network. The subscriber record may be located in a supplementary service database in an intelligence network node of the cellular telephony network, as in the first embodiment of FIG. 1, or in the SIM 116 of a mobile station, as in the second embodiment of FIG. 6.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. A system for providing call barring services in a cellular telephony network, comprising:

a memory unit that stores a plurality of subscriber records, each of said subscriber records being associated with a respective mobile subscriber by means of an international mobile subscriber identity and including a screening list of barred numbers for said mobile subscriber;

comparison means for comparing a called party number, received from a mobile terminal associated with said mobile subscriber, with the respective screening list of barred numbers in the subscriber record associated with said mobile subscriber, whereby a call initiation request from said mobile terminal is barred when one of the barred numbers within said screening list corresponds to said called party numbers;

a home location resister for storing information on whether said mobile subscriber subscribes to said call barring services; and a switching center for controlling call operations, wherein said switching center determines, upon said call initiation request, said mobile subscriber subscribes to said call barring services by means of said information stored in said home location resister and accesses said memory unit by means of transmitting said international mobile subscriber identity and said called party number.

2. The system of claim 1, further comprising:

a switching system that controls routing of call operations in said cellular telephony network; and a signaling system connected to said switching system that provides signaling for call operations, wherein said memory unit is located within said signaling system.

3. The system of claim 2, wherein said signaling system comprises:

a signaling database point, wherein said memory unit is located within said signaling database point; and a signaling control point for accessing said plurality of subscriber records stored in said memory unit, said comparison means comprising said signaling control point.

4. The system of claim 3, wherein said switching system comprises:

said home location register;

said switching center; and a visitor location register for storing information on whether currently served mobile subscribers subscribe to call barring services.

5. The system of claim 3, further comprising an operating service system that accesses and modifies said plurality of subscriber records in said memory unit located within said signaling database point.

6. The system of claim 1, wherein said switching center interacts with said mobile station, by means of an application, associated with said mobile subscriber to modify the respective subscriber record associated with said mobile subscriber in response to receiving a password from said mobile terminal, wherein said application resides in said switching center and collects new call barring data from said mobile terminal by means of unstructured supplementary service data protocol messages, subsequently said switching center transmits said new call barring data to said memory unit by means of signal connection control point messages.

7. The system of claim 1, further comprising
an intelligence network node connected to said switching center, wherein said memory unit is located within said intelligence network node, wherein said intelligence network node is shared among all of a plurality of switching centers in said cellular telephony network.

8. The system of claim 1, wherein said mobile subscriber accesses said memory unit to modify said call barring data by means of the Internet using TCP/IP protocol.

9. The system of claim 1,
wherein said home location register includes said memory unit.

10. The system of claim 1, wherein said subscriber records further include a list of call barring options that specify the treatment of said barred numbers on said screening list.

11. The system of claim 1, wherein said memory unit and said comparison means are within a mobile station, said home location register and said switching center being in communication with said mobile station.

12. The system of claim 1, wherein said memory unit comprises a subscriber identity mobile.

13. The system of claim 1, wherein a given one of said subscriber records includes a password.

14. A method for providing call barring services in a cellular telephony network comprising the steps of:
storing subscriber data on whether said mobile subscriber subscribes to said call barring services within a home location register;
receiving a request for a call initiation that includes a number of a called party and an international mobile subscriber identity number of said mobile subscriber from said mobile terminal associated with said subscriber;
determining whether said mobile subscriber subscribes to said call barring services by means of said information stored in said home location register;
accessing a subscriber record associated with said international mobile subscriber identity number of said mobile subscriber that is stored in a supplementary service database having a plurality of subscriber records, wherein said subscriber record contains a screening list of barred numbers, wherein said step of accessing further includes transmitting a message that includes said international mobile subscriber identity and said called party number;
determining whether the request for call initiation is barred by analyzing the screening list in the subscriber record and the number of the called party; and
in response to determining that the request for call initiation is barred, forwarding a call bar message to said mobile terminal associated with said mobile subscriber.

15. The method of claim 14, further comprising the steps of:
receiving a request to register said mobile station associated with said mobile subscriber, said request includes said international mobile subscriber identity number of the mobile subscriber;
accessing said home location register to obtain said subscriber data associated with said international mobile subscriber identity of the mobile subscriber; and
storing said subscriber data in a visitor location register.

16. The method of claim 15, further comprising the steps of:
after said step of receiving the request for call initiation, accessing said subscriber data in said visitor location register to determine whether the mobile subscriber has subscribed to call barring services; and
in response to determining that the mobile subscriber has subscribed to call barring services, performing said step of accessing a subscriber record associated with said international mobile subscriber identity number of the mobile subscriber.

17. The method of claim 16, further comprising the steps of:
in response to determining that the request for call initiation is not barred, proceeding to process the request for call initiation.

18. The method of claim 17, wherein the step of accessing the subscriber record, comprises the steps of:
transmitting said message that includes the number of the called party and said international mobile subscriber identity number of said mobile subscriber to a signaling point in a signaling network of the cellular telephony network; and
accessing a supplementary service database located in said signaling network.

19. The method of claim 18, wherein the step of determining whether the request for call initiation is barred by analyzing the screening list in the subscriber record and the number of the called party, comprises the steps of:
determining if the number of the called party is listed in the screening list of the subscriber record; and
determining if call barring options included in the subscriber record indicate that the call is barred; and
transmitting a message by the signaling point to indicate whether the request for call initiation is barred.

* * * * *

UNITED STATES PATENT AND TRADEMARK OFFICE
CERTIFICATE OF CORRECTION

PATENT NO. : 6,311,055 B1  Page 1 of 1
DATED : October 30, 2001
INVENTOR(S) : David Boltz It is certified that error appears in the above-identified patent and that said Letters Patent is hereby corrected as shown below:

<u>Title page,</u>
Item [57], ABSTRACT,
Line 19, please add after the last sentence: -- The SIM stores a subscribers record of the mobile subscriber associated with the SIM. At call origination, the mobile station reads the subscriber record stored in the SIM and compares the requested outgoing call to the call barring options. If the subscriber record indicates that the call is barred, the mobile station displays a call barred message to the mobile subscriber. --

<u>Column 10,</u>
Line 32, please delete "numbers" and replace with -- number --
Line 33, please delete "resister" and replace with -- register --
Line 40, please delete "resister" and replace with -- register --

Signed and Sealed this

Eighth Day of April, 2003

JAMES E. ROGAN
*Director of the United States Patent and Trademark Office*